United States Patent [19]
van Laar

[11] Patent Number: 5,836,179
[45] Date of Patent: Nov. 17, 1998

[54] MANUFACTURE OF KNITTED BRIEF BLANKS

[76] Inventor: Antonie Hendrick van Laar, Edificio Navegador Lote 2-6B, Avenida 25, Portugal

[21] Appl. No.: 615,325
[22] PCT Filed: Sep. 7, 1994
[86] PCT No.: PCT/GB94/01938
    § 371 Date: Aug. 8, 1996
    § 102(e) Date: Aug. 8, 1996
[87] PCT Pub. No.: WO95/07381
    PCT Pub. Date: Mar. 16, 1995

[30] Foreign Application Priority Data
    Sep. 8, 1993 [GB] United Kingdom ................ 9318617

[51] Int. Cl.$^6$ ............................................. D04B 1/24
[52] U.S. Cl. ............................ 66/171; 66/176; 66/177
[58] Field of Search ............................. 66/171, 176, 177

[56] References Cited

U.S. PATENT DOCUMENTS

| 3,985,003 | 10/1976 | Reed | 66/176 X |
|---|---|---|---|
| 4,531,525 | 7/1985 | Richards | 66/176 X |
| 4,887,439 | 12/1989 | Tenconi | 66/176 X |
| 4,920,769 | 5/1990 | Rickerl | 66/176 |
| 5,031,424 | 7/1991 | Peleg et al. | 66/176 |
| 5,081,854 | 1/1992 | Lonati | 66/176 |
| 5,590,548 | 1/1997 | Osborne | 66/171 |
| 5,605,060 | 2/1997 | Osborne | 66/171 |

FOREIGN PATENT DOCUMENTS

| 1278007 | 10/1961 | France | 66/176 |
|---|---|---|---|
| 1941322 | 5/1971 | Germany | 66/176 |

OTHER PUBLICATIONS

Integrated Brief Production: A New Approach; Dennis R. Goadby, FTI, AMBIM; Knitting International, vol. 83, NO. 996; pp. 51–52, Dec. 1976.

Primary Examiner—John J. Calvert
Attorney, Agent, or Firm—Frijouf, Rust & Pyle, P.A.

[57] ABSTRACT

A method of knitting side-by-side brief blanks (BLK, BLK') in the form of a tube (T) on an electronically controlled circular knitting machine wherein the tube (T) is shaped by needle selection (50) between the brief blanks (BLK, BLK') to form apertures (AP, AP') which provide leg openings (LO, LO') by taking out of action needles (50') which would otherwise knit yarn across the apertures (AP, AP'). At the same time yarn feed (Y2) to the inoperative needles (50') is cut (42, 44) and trapped (46) whereby the apertures (AP, AP') are formed. End portions of the blanks (BLK, BLK') remain interconnected until the tube (T) is slit walewise to provide separate blanks (BLK, BLK') for making up briefs. Since yarn is not knitted across the apertures (AP, AP'), a considerable saving in the use of yarn is effected whilst shaping of leg openings (LO, LO') is facilitated.

10 Claims, 5 Drawing Sheets

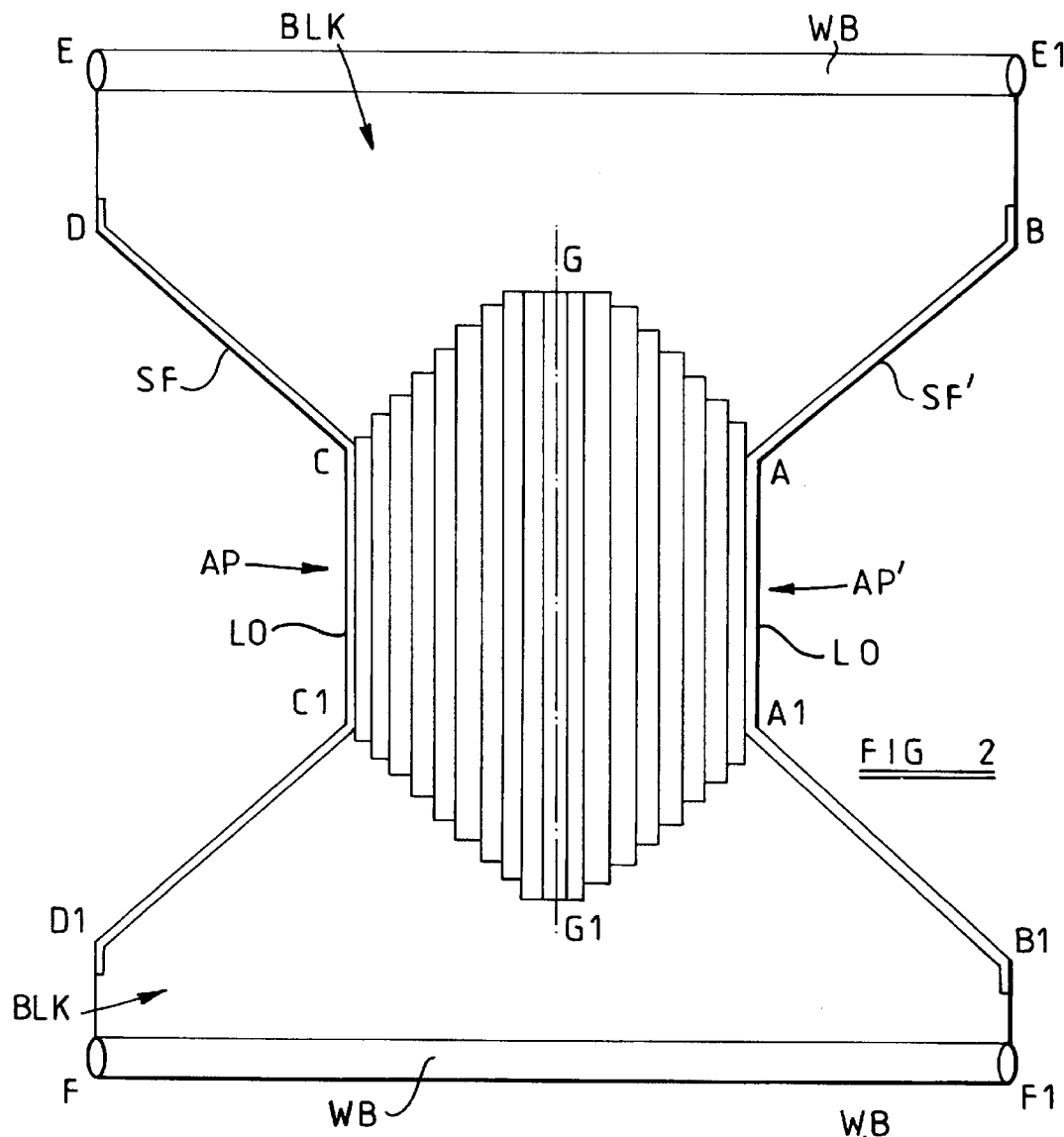

MANUFACTURE OF KNITTED BRIEF BLANKS

The present invention relates to the manufacture of knitted brief blanks from which briefs are produced.

By briefs is meant a garment comprising a body portion adapted to cover the lower portion of a wearers trunk from the waist downwards to and beneath the crotch, and having therein two leg openings at respectively opposite sides of the crotch portion which closes the garment at its lower end.

Traditionally, knitted briefs were manufactured by a process known as cutting and sewing in which a blank of the shape illustrated in FIG. 1 of British patent no. 1 485 952 was cut manually from flat knitted fabric. The blank was then side seamed into a brief proper. Clearly this process was time consuming and thus expensive.

The invention disclosed in British patent no. 1 485 952 represented a significant step forward in that a brief blank of the required form was produced from a seamless tubular blank on a circular knitting machine. This tubular blank was then slit, flattened and side-seamed.

European patent no. 0 211 641 provided a further step forward in that it enabled a row of brief blanks to be knitted in the form of a tube which blanks were interconnected in side-by-side relationship. FIG. 5 of the European patent illustrates an unslit waisted tube having walewise separation positions 22 which, when slit, provides two brief blanks for side seaming into briefs proper.

The method described in the European patent has worked well commercially save that, especially when three or more blanks have been knitted in a row, when walewise separation has been effected there has been a tendency for the crotch portion not to shrink sufficiently laterally between the points AC and A1-C1 as viewed in FIG. 2. This has meant that it has been necessary for an operator to cut away fabric between the lines A-A1 and C-C1 which is clearly undesirable since it slows down production. Even when only two blanks have been produced it has occasionally been necessary to cut away fabric as described above.

The present invention seeks to reduce the amount of yarn wasted in knitting a blank, more especially a brief blank, when knitted as one of a row of blanks as described in European patent no. 0 211 641.

In accordance with the present invention there is provided a method of knitting a plurality of brief blanks in a row in side-by-side relationship in the form of a tube, which method comprises knitting a said tube on an electronically controlled circular knitting machine having full electromechanical needle to needle selection and stitch length control, and comprising the steps of shaping by needle selection the tube at positions between brief blanks more especially to form apertures which are to provide leg openings by taking out of action needles which would otherwise knit yarn across said apertures whilst simultaneously cutting and trapping yarn fed to said inoperative needles whereby said apertures are formed between brief blanks with end portions of the latter remaining interconnected, and slitting the tube walewise at positions between said blanks to provide a plurality of separate brief blanks of the required form for brief manufacture.

One advantage of the present invention is that it enables the amount of yarn wasted by cut loss in the method of European patent number 0 211 641 to be reduced by 15 to 20% dependent upon the number of brief blanks produced in a row.

A further advantage of the invention is that the shaping of the leg opening is facilitated considerably enabling each blank to be shaped and styled for a particular end use, e.g. fashion, sports or medical applications. In this connection it will be seen that different types of briefs, e.g. a sports brief and a fashion brief can be produced in the same row of a tube.

The invention will now be described further by way of example with reference to the accompanying drawings in which:

FIG. 2 shows an opened out flat knitted brief blank produced from the knitted tube shown in FIG. 1;

FIG. 3 illustrates one of the blanks, shown in FIG. 2 folded over into brief form ready for seaming;

FIG. 4 illustrates briefs completed from the folded over blank of FIG. 3;

Figure 1:
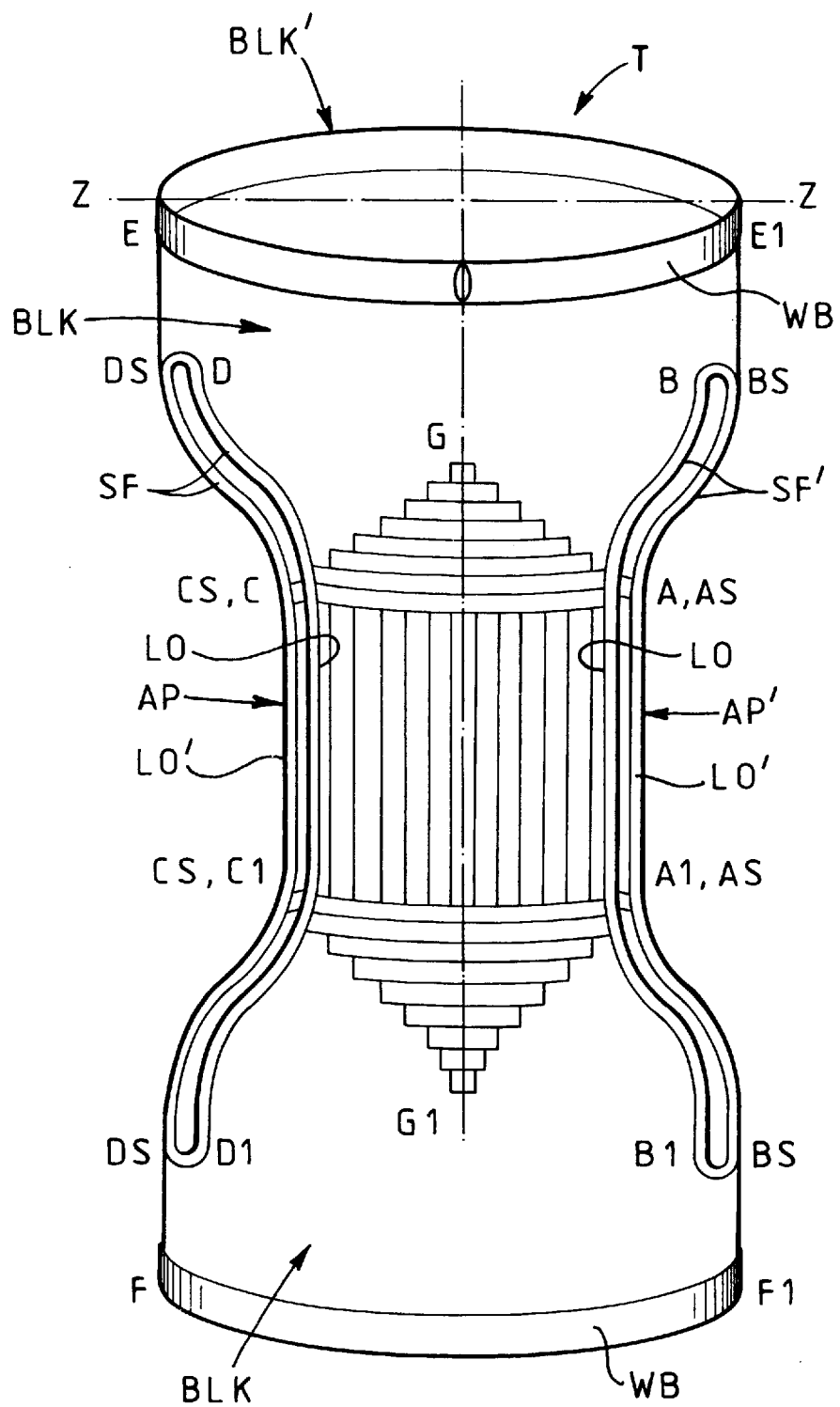
FIG. 1 shows, in diagrammatic form, an unslit waisted tube as taken down from a circular knitting machine.

The waisted tube T shown in FIG. 1 is knitted by wholly rotary knitting on an electronically controlled multi-feed circular knitting machine. The tube T consists of two overlaid and connected brief blanks BLK and BLK' and is of generally hour glass form after removal from the machine.

An aperture AP is shown as elongate and generally parallel sided. It will be appreciated that the shape is for ease of illustration only since, in practice, the aperture is wider at its centre than at its ends as may be seen from FIG. 5. The aperture AP has a "shaping fringe" SF formed between DS-CS-CS-DS-D1-C1-C-D and, at that side provides leg openings LO, LO' respectively one to each blank BLK, BLK'. Similarly at the other or right side a further aperture AP' having a "shaping fringe" SF' extend between BS-AS-AS-BS-B1-A1-A1-B and provides a further leg opening LO or LO' to each blank. The crotch portion is shown between G and G1.

The blanks BLK, BLK' are connected at their ends E-D, DS and F-D1, DS, and also at E1-B, BS and F1-B1, BS. The portions E-E1 and F-F1 of the front brief blank BLK will form the waistband WB of a brief produced from that blank, the same arrangement applying to the rear brief blank BLK'. In order to facilitate separation of the two brief blanks a number of needles of the machine, e.g., three, are omitted at diametrically opposite portions of the tube T as indicated at Z—Z in a known manner.

Forming of the apertures AP, AP' during knitting avoids the considerable wastage of yarn that would otherwise have been knitted across the apertures AP, AP' and then subsequently removed, as well as dispensing with the removal operation.

Figure 6:
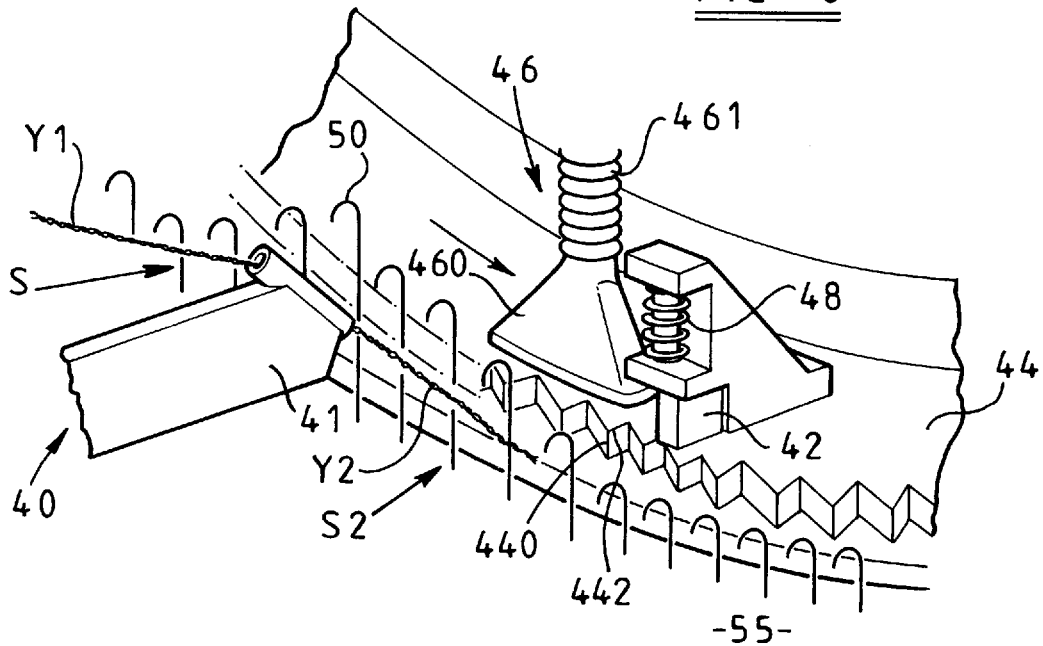
FIGS. 6 and 7 illustrates diagrammatically a method of performing the invention using a yarn cutter and trapper.
Figure 7:
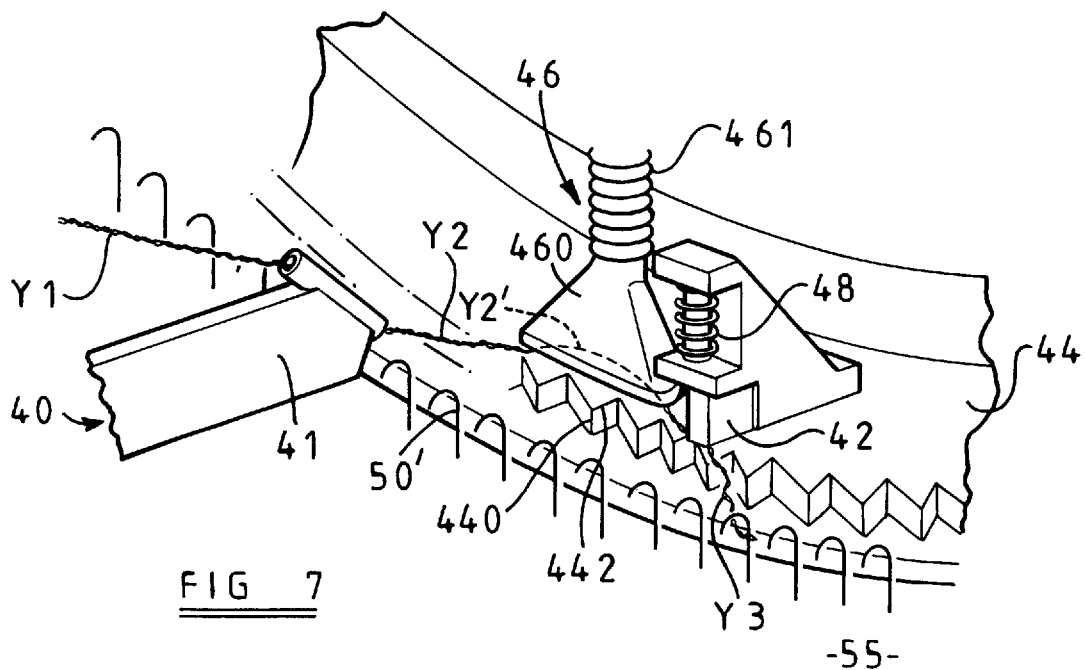

Referring to FIGS. 6 and 7 there is shown diagrammatically part of a circular knitting machine in which a yarn feeder is indicated at 40 having a feeder arm 41, an upper fixed yarn cutter or knife at 42, a yarn transporter and rotary lower cutter at 44 and a yarn trapping device at 46.

Although the cutter 42 is in a fixed position in relation to the rotary cutter 44, it is spring loaded at 48 against the face of the latter at the peripheral teeth 440 for an effective cutting action. The cutter 44 is a ring of flat circular saw tooth form and is rotationally fast with the needle cylinder 55 of the machine. The teeth 440 are of ratchet or buttress form to each provide a cutting edge 442 for edgewise co-operation with the fixed cutter 42.

Yarn is designated Y1 to the feeder arm 41, at Y2 from the feeder arm 41 to selected needles 50, and at Y3 away from the cutters 42, 44. The needle selecting system being known is not shown.

As the needle cylinder 55 rotates individual needles 50 are selected at the position S1 (FIG. 6). The selected needles 50 are raised by the needle cam actuation means in a known manner to clear the old or previously knitted loops and position the needles to receive yarn Y2 from the feeder arm 41 to enable new or further loops to be formed. This knitting action continues for a group or number of selected needles 50.

When the last needle of a selected group of needles is reached and passes the feeder arm 41, subsequent needles 50' remain at a lower or inoperative level as shown in FIG. 7 and so simply pass by the arm 41. Yarn feed Y2 from the feeder arm 41 then passes over the inoperative needles 50' inwards towards the centre of the machine knitting head and, in so doing, is caught in the teeth 440 of the transporter/cutter 44 as it rotates with the needle cylinder 55 at the same speed as the latter. In FIG. 7 the yarn Y2 is shown caught by a tooth 440 just prior to being cut and is also shown already initially drawn at Y2' into the suction nozzle 460.

The caught yarn is then scissored by the action of the rotary cutter 44 and the fixed cutter 42. This action produces two loose yarn ends, one at and with the end of the group of selected needles at Y3 i.e., away from the cutters 42, 44 and the other Y2' from the feeder arm 41. This end Y2' is retained by the suction action of the trapping device 46 in the nozzle 460 and suction tube 461 of the latter.

When the leading needle of the next selected group of needles 50 reaches the yarn end Y2' from the feeder arm 41, it collects the yarn end in the leading needle hook and takes the yarn into a knitting action at the knitting point S2 adjacent the arm 41 by withdrawing the yarn end Y2' from the trapping device 46. The following selected needles 50 then continue the knitting action. Having regard to the speed of rotation of the needle cylinder 55 and of the operation of the machine, each above-mentioned yarn end Y2' is only very momentarily received in the suction trapping device 46. The suction device 46 also serves to remove any minor fragments of yarn and fluff in the vicinity of the yarn feeder arm 41 and needles 50, 50'.

Figure 8:
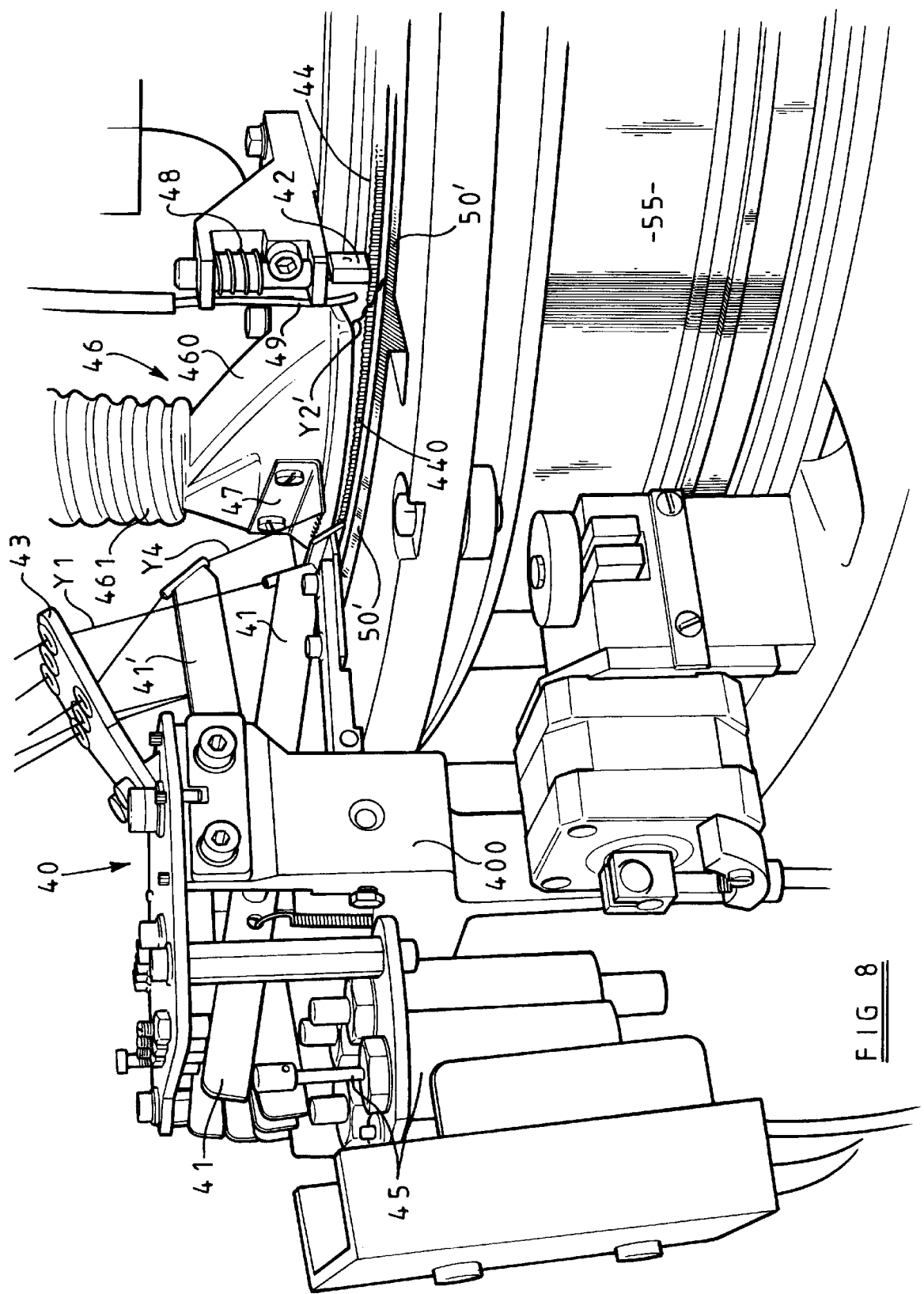
FIG. 8 is a perspective view showing the arrangement of FIG. 6 and 7 applied in practice to a multi-feed circular knitting machine.

In FIG. 8 a practical form of the yarn feeding, cutting and trapping arrangement or station on a multi-feed circular knitting machine is shown in which the feeder arm 41, or each such arm of the yarn feeder 40, is raised for yarn take up by a selected group of needles 50 or lowered (as shown) when inoperative needles 50' are passing the feeder arm 41. For this purpose the arm 41 is pivoted in the body 400 of the yarn feeder 40 and operated by a solenoid 45 or other suitable actuator controlled by the electronic system of the machine.

Yarn Y1 is guided at 43 to the feeder arm 41 and also to other arms 41' of the feeder 40, which arms 41' are shown in an inoperative position with their yarn Y4 held by a blade or plate 47 carried by the suction nozzle 460 in readiness for use when required.

The fixed cutter 42 is shown spring loaded at 48 against the rotary cutter 44 and a pressurised air supply pipe is provided at 49 for blowing away small pieces of yarn and fluff from the cutting area.

Although not visible yarn Y2' from the feeder arm 41 enters the suction nozzle 460 but is shown extending from the latter to the fixed cutter 42 where it is about to be cut prior to being instantly and fully drawn into the nozzle 460. The cut end Y3 (FIG. 7) moves away in engagement with retracted needles 50' as the latter travel away from the fixed cutter 42, which needles follow the end of a previously selected group.

The two "loose yarn ends" one Y3 following at the end of a selected needle knitting group and the other Y2' at the beginning of the next selected needle knitting group produce the "shaping fringe" SF or SF1 (FIGS. 1, 2 and 5), each yarn end being approximately 15 mm long. The "shaping fringe" is removed during the making up operation and constitutes the only waste material produced.

Figure 5:
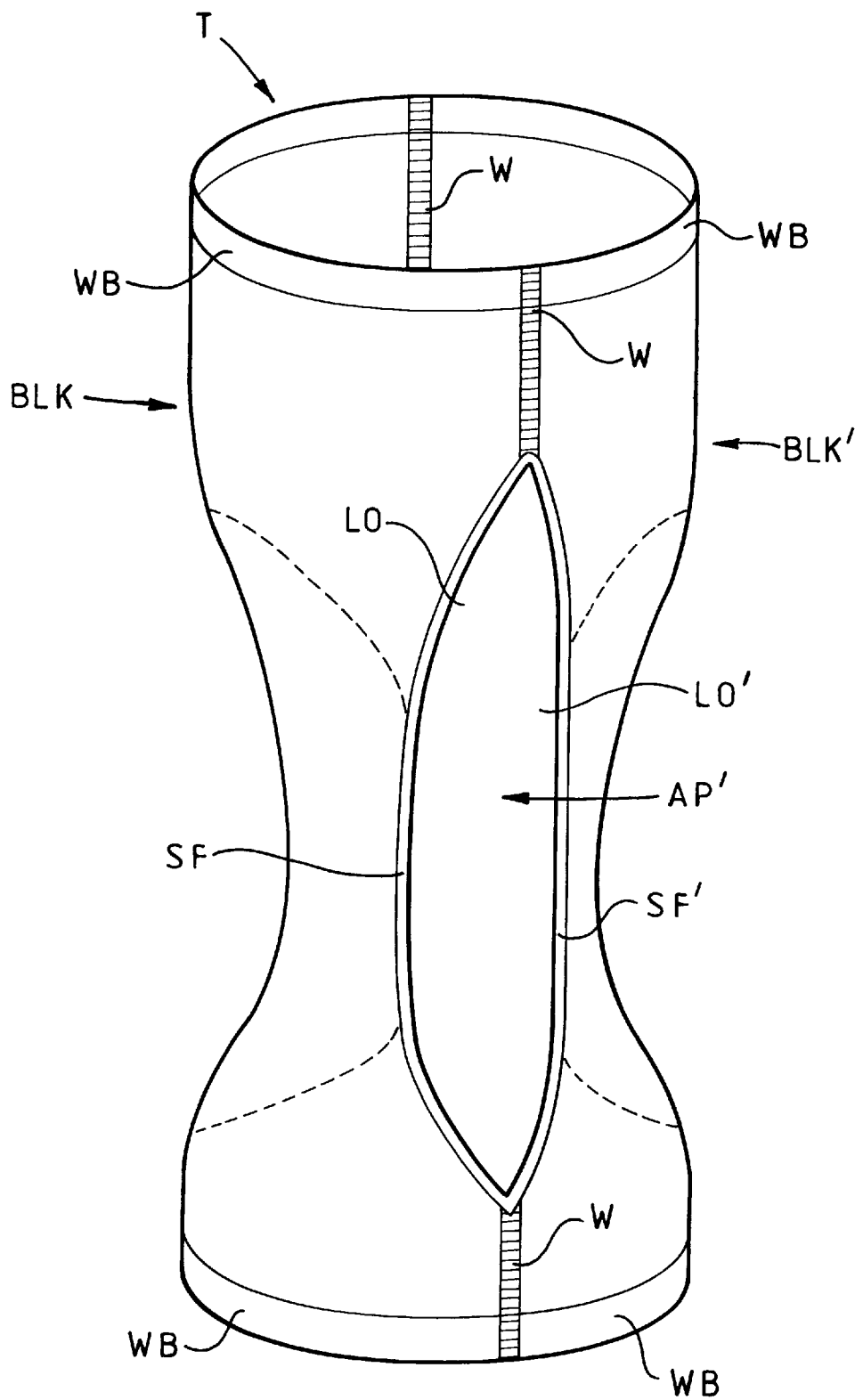
FIG. 5 illustrates a modified unslit waisted tube of FIG. 1 turned through a right angle.

After the knitted tube lengths T have been produced they are relaxed, normally by tumbling. Walewise separation then occurs along the walewise separation portions W (FIG. 5). In the making up operation, best seen in FIGS. 2 to 4, the edges which will form the leg openings LO, are trimmed or machined to elasticate and/or attach lace fabric for decoration. These processes remove the "shaping fringes" SF, SF' as referred to above.

Each individual blank BLK or BLK' such as the blank BLK (FIG. 2) is then folded as shown in FIG. 3 face to face inwardly and the side seams are made to complete the briefs', shown in FIG. 4.

The briefs are then finalised in bulk and are given finishing treatments as required, i.e. dyeing etc. The individual briefs are then turned inside out, inspected, folded and packed as required.

It will be apparent that whereas in the described embodiment two brief blanks are provided in a row in side-by-side relationship, in practice, more than two blanks may be knitted in a row, the actual number depending upon both the size of the briefs required and that of the machine diameter.

EXAMPLE OF KNITTING MACHINE

A tubular length of fabric as illustrated in FIG. 5 was knitted upon a 13 inch diameter, 28 gauge, 1152 needles, 4 feeds, 150/120 rev/min circular knitting machine. The machine had fully programmable unlimited electromechanical needle selection and stitch length control. A yarn cutting and trapping system was provided at each knitting point. The four feeding stations were arranged about the needle cylinder in an equi-spaced manner corresponding to the knitting points.

What is claimed is:

1. A method of forming a plurality of brief blanks on a circular knitting machine having needle selection and stitch length control, the method comprising the steps of:

forming a tube of brief blanks in a side-by-side relationship;

forming apertures at positions between the brief blanks as leg openings by taking needles out of action to cause the needles to be inoperative;

cutting and trapping yarn feed to the inoperative needles; and slitting the tube walewise at positions between the blanks to provide a plurality of separate brief blanks for brief manufacture.

2. The method of forming a plurality of brief blanks according to claim 1, wherein the yarn feed is cut and trapped after the passage of a group of selected operative needles past the point of the yarn feed in readiness for taking up the trapped yarn by a next group of operative needles and following the passage of said inoperative needles.

3. The method of forming a plurality of brief blanks according to claim 1, wherein yarn feed to the inoperative needles is cut by a fixed cutter co-operating with a rotary toothed cutter rotatable with the needle cylinder of the knitting machine which rotary toothed cutter also serves to catch said yarn feed for said cutting.

4. The method of forming a plurality of brief blanks according to claim 1, wherein the yarn feed to the inoperative needles is trapped by means of a suction device.

5. The method of forming a plurality of brief blanks according to claim 3, wherein the fixed cutter is spring loaded against a face part of the rotary toothed cutter containing the cutter teeth thereof for obtaining an effective yarn cutting action.

6. A method of forming a plurality of brief blanks on an electronically controlled circular knitting machine having full electro-mechanical needle to needle selection and stitch length control, comprising the steps of:

forming a tube of brief blanks in a side-by-side relationship;

forming apertures at positions between the brief blanks as leg openings by taking needles out of action to cause the needles to be inoperative;

simultaneously cutting and trapping yarn feed to the inoperative needles for forming apertures between brief blanks with end portions of the brief blanks remaining interconnected, and slitting the tube walewise at positions between the blanks to provide a plurality of separate brief blanks for brief manufacture.

7. The method of knitting a plurality of brief blanks according to claim 6, wherein the yarn feed is cut and trapped after the passage of a group of selected operative needles past the point of said yarn feed in readiness for taking up the trapped yarn by a next group of operative needles and following the passage of said inoperative needles.

8. The method of knitting a plurality of brief blanks according to claim 6, wherein yarn feed to the inoperative needles is cut by a fixed cutter co-operating with a rotary toothed cutter rotatable with the needle cylinder of the knitting machine which rotary toothed cutter also serves to catch said yarn feed for said cutting.

9. The method of knitting a plurality of brief blanks according to claim 6, wherein the yarn feed to the inoperative needles is trapped by means of a suction device.

10. The method of knitting a plurality of brief blanks according to claim 6, wherein the fixed cutter is spring loaded against a face part of the rotary cutter containing the cutter teeth thereof for obtaining an effective yarn cutting action.

\* \* \* \* \*